(12) United States Patent
Okuhata et al.

(10) Patent No.: US 7,801,018 B2
(45) Date of Patent: Sep. 21, 2010

(54) DIVERSITY RECEIVER, AND METHOD FOR RECEIVING ORTHOGONAL FREQUENCY DIVISION MULTIPLEX SIGNAL

(75) Inventors: Yasuhide Okuhata, Yokohama (JP); Atsushi Shinoda, Sagamihara (JP)

(73) Assignee: Kabushiki Kaisha Kenwood, Hachiouji-shi, Tokyo (JP)

( * ) Notice: Subject to any disclaimer, the term of this patent is extended or adjusted under 35 U.S.C. 154(b) by 1156 days.

(21) Appl. No.: 10/450,111

(22) PCT Filed: Dec. 7, 2001

(86) PCT No.: PCT/JP01/10742

§ 371 (c)(1), (2), (4) Date: Jun. 11, 2003

(87) PCT Pub. No.: WO02/49250

PCT Pub. Date: Jun. 20, 2002

(65) Prior Publication Data

US 2004/0022215 A1    Feb. 5, 2004

(30) Foreign Application Priority Data

Dec. 12, 2000 (JP) ............................. 2000-376907
Dec. 14, 2000 (JP) ............................. 2000-380005

(51) Int. Cl.
*H04J 11/00* (2006.01)
*H04J 1/00* (2006.01)
*G01R 31/08* (2006.01)
*H04W 4/00* (2009.01)
*H03C 7/02* (2006.01)

(52) U.S. Cl. ...................... 370/208; 370/252; 370/334; 370/343; 455/101

(58) Field of Classification Search .................. 370/334, 370/533, 535, 288, 339, 310, 208, 252, 343; 375/133, 267; 455/249.1, 101

See application file for complete search history.

(56) References Cited

U.S. PATENT DOCUMENTS 5,697,081 A * 12/1997 Lyall et al. ................ 455/249.1

(Continued)

FOREIGN PATENT DOCUMENTS

EP    1 041 736    1/2000

(Continued)

OTHER PUBLICATIONS

International Search Report, Feb. 12, 2000.

(Continued)

*Primary Examiner*—Nittaya Juntima
*Assistant Examiner*—Leon Andrews
(74) *Attorney, Agent, or Firm*—Eric J. Robinson; Robinson Intellectual Property Law Office, P.C.

(57) ABSTRACT

A diversity receiver capable of stably receiving an orthogonal frequency division multiplex signal, wherein a demodulator is so operated that the attenuation of the received signal is varied step by step every time a period corresponding to a guard interval section comes if it is determined that the reception level is increased by switching the attenuation in any one of variable attenuators, and the demodulator is so operated that the variable attenuator designated by an antenna control pointer is changed and the attenuation is varied if it is determined that the variable attenuator designated by an antenna control pointer is identical with the variable attenuator designated by an antenna fixing pointer.

14 Claims, 9 Drawing Sheets

U.S. PATENT DOCUMENTS

| | | | |
|---|---|---|---|
| 5,736,959 A | * | 4/1998 | Patterson et al. ............ 342/354 |
| 5,940,454 A | | 8/1999 | McNicol et al. |
| 6,157,621 A | * | 12/2000 | Brown et al. ................ 370/310 |
| 6,539,063 B1 | * | 3/2003 | Peyla et al. ................. 375/267 |
| 6,728,294 B1 | * | 4/2004 | Kohno et al. ................ 375/133 |

FOREIGN PATENT DOCUMENTS

| | | |
|---|---|---|
| JP | 10-075235 | 3/1998 |
| JP | 11-289285 | 10/1999 |
| JP | 2000-183795 | 6/2000 |
| JP | 2000-278243 | 10/2000 |

OTHER PUBLICATIONS

Written Notification of Reason for Refusal dated Aug. 19, 2004 for JP 2000-376907, Eng.

Search Report (Application No. 01270970.5) dated Apr. 1, 2010, Eng.

* cited by examiner

DIVERSITY RECEIVER, AND METHOD FOR RECEIVING ORTHOGONAL FREQUENCY DIVISION MULTIPLEX SIGNAL

TECHNICAL FIELD

The present invention relates to a diversity receiver for receiving a radio wave signal with a plurality of antennas, and more particularly to a diversity receiver for receiving a radio wave signal subjected to orthogonal frequency division multiplex on a transmission side.

RELATED ART

An orthogonal frequency division multiplex (OFDM) system is known as a system for transmitting radio wave digital signals.

With this orthogonal frequency division multiplex system, digital signals are multiplexed by using a number of subcarriers having different frequencies to efficiently transmit digital signals. With this orthogonal frequency division multiplex system, a guard interval section is set before an effective symbol section so that the reception characteristics can be prevented from being degraded by inter-symbol interference even if a multi-path is formed.

Figure 9:
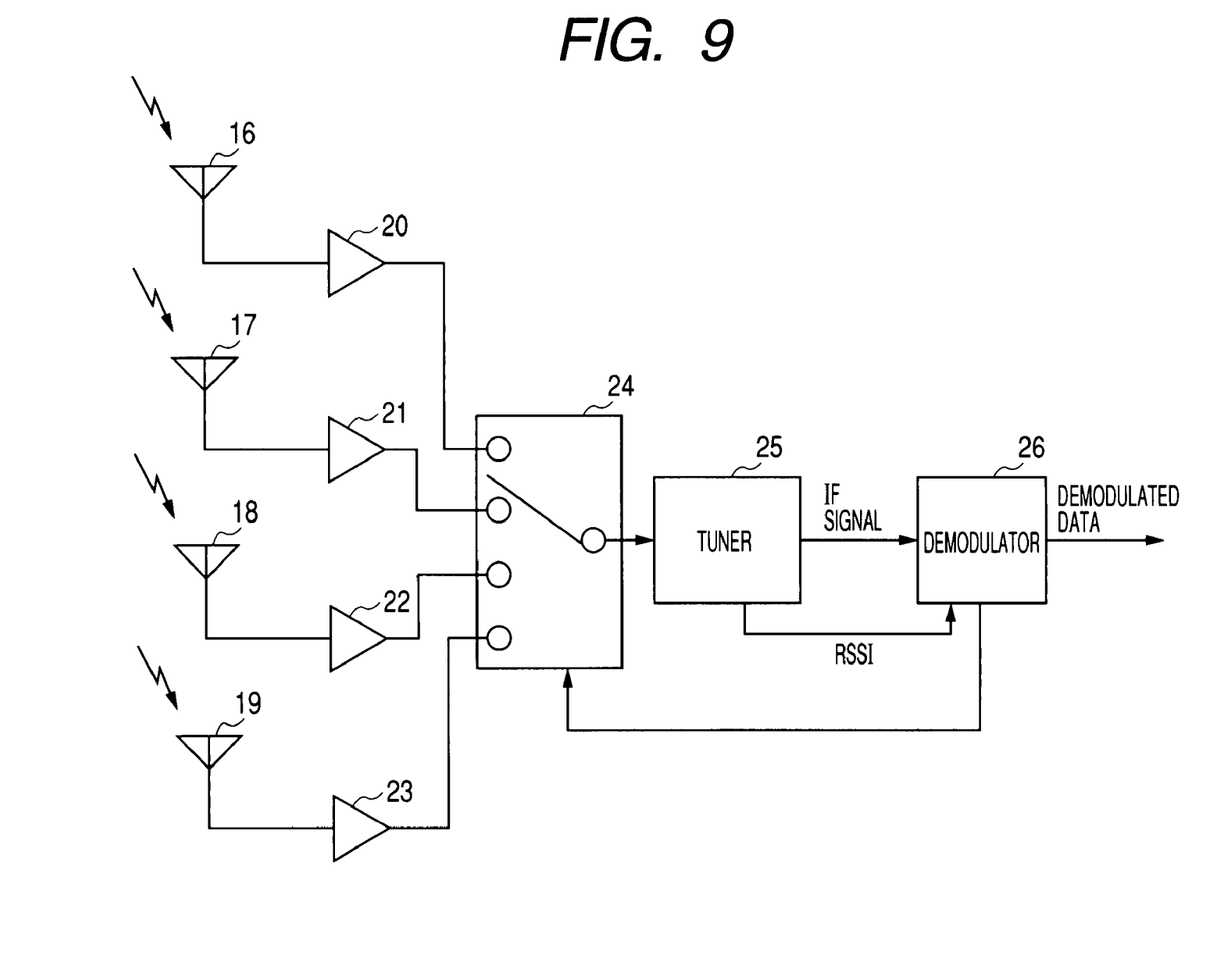
FIG. 9 is a diagram showing the structure of a conventional diversity receiver.

A diversity receiver of an antenna switching type such as shown in FIG. 9 is known which alleviates the fading influence to be caused by mobile reception of a radio wave signal subjected to orthogonal frequency division multiplex.

In the conventional diversity receiver shown in FIG. 9, a radio wave signal received with each of antennas 16 to 19 is amplified by each of LNAs 20 to 23 and then input to a selector 24. The selector 24 selects one of the radio wave signal in accordance with a select signal from a demodulator 26, and supplies it to a tuner 25. The tuner 25 frequency-converts a radio frequency (RF) signal in a desired band into an intermediate frequency (IF) signal and sends it to the demodulator 26.

The tuner 25 detects the level of a received signal and notifies the demodulator 26 of a received signal strength indication (RSSI) signal. The demodulator 26 monitors the RSSI signal, and when the signal level reaches a predetermined threshold value or lower, controls the selector 24 to make it select another received signal among the received signals. If the level of the newly selected signal has also the threshold value or lower, the signal selection operation is repeated.

The conventional diversity receiver cannot know in advance whether the received signal to be newly selected has a higher level. The reception state after switching may become worse than that before switching. In this case, it becomes impossible to stably receive the signal subjected to orthogonal frequency division multiplex.

If the demodulator 26 shown in FIG. 9 demodulates a digital signal by using an equalizer, the frequency characteristics thereof change abruptly when the received signal is switched. In this case, reception signal equalizing errors become large with a high possibility of demodulation errors.

The present invention has been made under such circumstances and aims to provide a diversity receiver capable of stably receiving a signal subjected to orthogonal frequency division multiplex.

DISCLOSURE OF THE INVENTION

In order to achieve the above objective, the present invention provides a diversity receiver for receiving a signal subjected to orthogonal frequency division multiplex by using a plurality of antennas, one symbol period of the signal consisting of an effective symbol section and a guard interval section, the diversity receiver comprising: a plurality of amplification means for individually amplifying a signal received with each of the antennas; a plurality of attenuation means for individually attenuating each received signal amplified by each of the amplification means; signal synthesis means for coupling a plurality of received signals attenuated by the attenuation means and generating a synthesized received signal; control means for individually controlling an attenuation amount of each of the attenuation means; and demodulation means for demodulating the synthesized received signal to obtain a digital signal.

The control means operate adjust the attenuation amount of each of the attenuation means in such a manner that the control means selectively supplies the signal synthesis means with a received signal received at least one of the antennas, and if received signals received at two or more antennas are to be supplied, the control means additionally supplies the signal synthesis means with only a received signal or signals contributing to a rise of a level of the synthesized received signal.

The control means judges during a period corresponding to the guard interval section whether or not the level of the synthesized received signal rises upon an additional supply of the received signal received at a given antenna. The judgment is performed by changing the attenuation amount of the attenuation means corresponding to the given antenna and measuring a change in the level of the synthesized received signal. In accordance with a measurement result of the change in the level of the synthesized received signal caused by changing the attenuation amount of the attenuation means for the given antenna, the control means determines a renewal target attenuation amount of the attenuation means for the given antenna and gradually changes the attenuation amount toward the determined renewal target attenuation amount. A change in the attenuation amount toward the renewal target attenuation amount is performed stepwise each time the period corresponding to the guard interval section arrives.

It is therefore possible to prevent an increase in errors of a signal equalizing process to be executed in order to demodulate the received signal and obtain a digital signal. An attenuation amount can therefore be set properly and a signal subjected to orthogonal frequency division multiplex can be received stably.

In the receiver of the invention, the control means changes the attenuation amount of the attenuation means corresponding to the given antenna during the period corresponding to the guard interval section, and after the level of the synthesized received signal is measured, changes at an end of the period the attenuation amount of the attenuation means to the attenuation amount before an attenuation amount change. Therefore, even if the attenuation amount of the attenuation means is changed, the effective symbol section (containing transmission information) is not influenced at all.

More specifically, changing the attenuation amount by the control means is classified into the following two patterns.

(i) The control means measures the level of the synthesized received signal by changing the attenuation amount of the attenuation means to a maximum value, judges whether or not the level of the synthesized received signal rises, and if it is judged that the level rises, increases stepwise the attenuation amount of the attenuation means whose attenuation amount was changed to the maximum value, each time the period corresponding to the guard interval section arrives.

(ii) The control means measures the level of the synthesized received signal by changing the attenuation amount of the attenuation means to a minimum, judges whether or not the level of the synthesized received signal rises, and if it is judged that the level rises, decreases stepwise the attenuation amount of the attenuation means whose attenuation amount was changed to the minimum value, each time the period corresponding to the guard interval section arrives.

In the receiver of the invention, in order to retain a proper process for any length of the guard interval section of a received signal, the control means gradually changes the attenuation level of the attenuation means whose attenuation amount is to be changed, during a plurality of periods corresponding to a plurality of consecutive guard interval sections, to monitor the change in the level of the synthesized received signal during the plurality of periods.

In the case, it is preferable that the control means measures the level of the synthesized received signal immediately before and after the attenuation amount of the attenuation means whose attenuation amount is to be changed, generates a signal indicative of a difference between levels measured immediately before and after, and accumulating the difference to judge whether or not there is a tendency that the level of the synthesized received signal rises.

Even if the guard interval section is short so that a change in the attenuation amount of a received signal does not result in an immediate change in the level of the synthesized received signal, it is possible to correctly measure the reception level and properly set the attenuation amount.

In the receiver of the invention, in order to realize the attenuation amount control for the attenuation means, the receiver of the invention utilizes a fix pointer for instructing to fix the attenuation amount of at least one of the plurality of the attenuation means corresponding to the plurality of antennas, and a variable pointer for designating an antenna for which the attenuation amount is changed. It is judged whether the attenuation means designated by the fix pointer is the same as the attenuation means designated by the variable pointer, if it is judged that the attenuation means are the same, the variable pointer is made to designate another of the attenuation means, and if it is judged that the attenuation means are different, the attenuation amount of the attenuation means designated by the variable pointer is changed. Generally, the fix pointer designates the attenuation means whose the attenuation amount is zero, among the plurality of the attenuation means. By utilizing this pointer function, a proper attenuation amount can be set with a simple process by fixing the attenuation amount of one of the plurality of the attenuation means when the attenuation amount is changed. Namely, a proper attenuation amount can be set wherein received signals received with a plurality of antennas are not switched, the reception level can be prevented from being lowered when the attenuation amount is changed, and a transmitted digital signal can be demodulated. It is therefore possible to stably receive a signal subjected to orthogonal frequency division multiplex.

EMBODIMENT OF THE INVENTION

By referring to the accompanying drawings, detailed description will be given on a diversity receiver 100 according to an embodiment of the invention.

Figure 1:
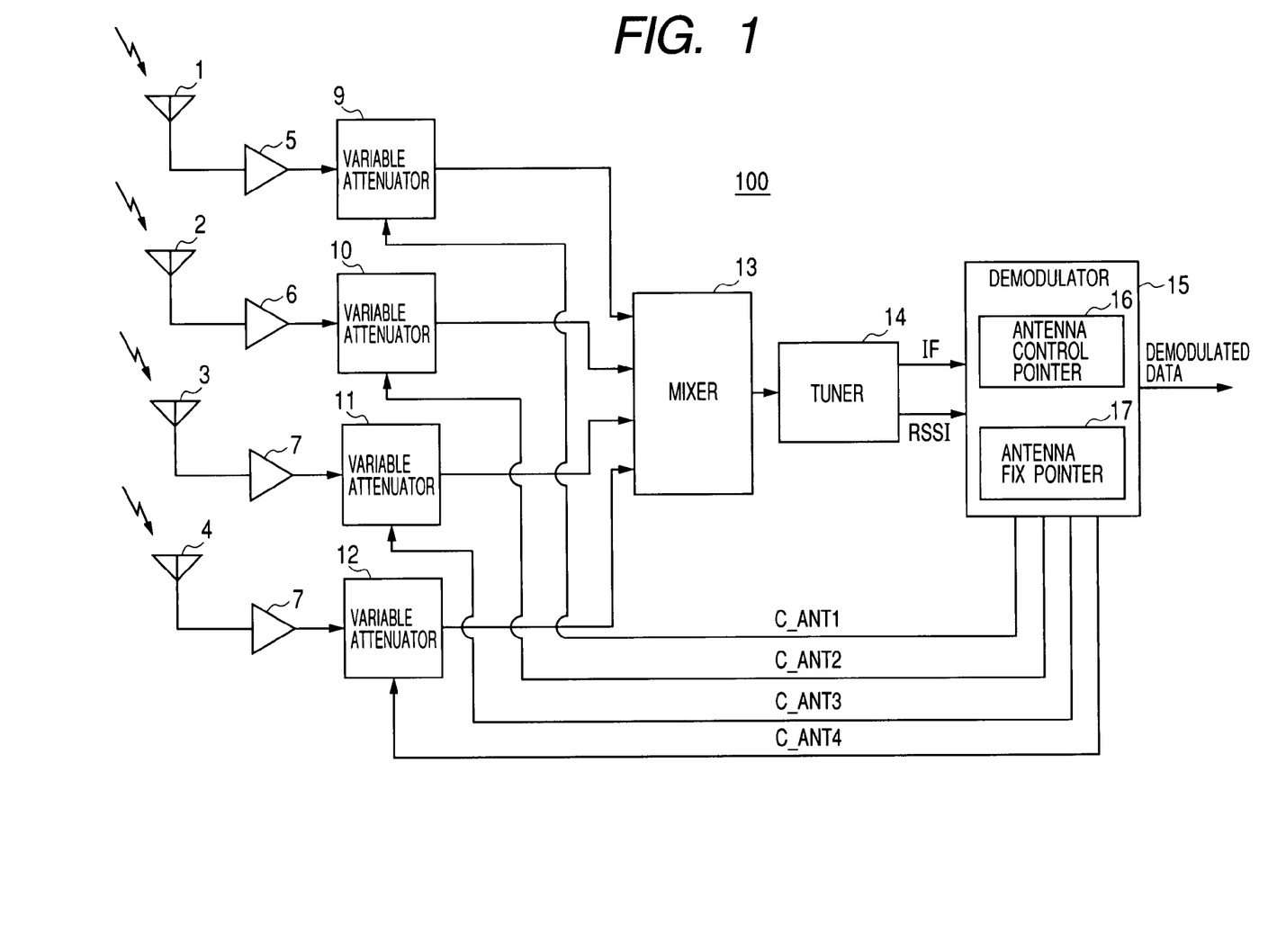
FIG. 1 is a diagram showing the structure of a diversity receiver according to an embodiment of the invention.

FIG. 1 is a diagram showing the structure of the diversity receiver 100 of the invention.

As shown, the diversity receiver 100 is constituted of a plurality of antennas 1 to 4, a plurality of low noise amplifiers (LNAs) 5 to 8, a plurality of variable attenuators 9 to 12, a mixer 13, a tuner 14 and a demodulator 15.

The plurality of antennas 1 to 4 receive radio frequency (RF) signals subjected to orthogonal frequency division multiplex (OFDM) on a transmission side and transmitted as a radio wave. The antenna 1 is coupled to the variable attenuator 9 via LNA 5. The antenna 2 is coupled to the variable attenuator 10 via LNA 6. The antenna 3 is coupled to the variable attenuator 11 via LNA 7. The antenna 4 is coupled to the variable attenuator 12 via LNA 8.

The RF signal subjected to orthogonal frequency division multiplex and received with each of the plurality of antennas 1 to 4 is a signal used for transmitting digital data by using a number of sub-carriers orthogonal to each other in a symbol period. One symbol section is divided into an effective symbol section and a guard interval section. The guard interval section is set before each effective symbol section in the symbol period. The guard symbol section is a redundant signal section copied from a back portion of the effective symbol section.

The plurality of LNAs 5-8 are provided in correspondence with the plurality of antennas 1 to 4 and amplify the received signals.

LNAs 5 to 8 send amplified received signals to the corresponding variable attenuators 9 to 12.

Control signals supplied from the demodulator 15 determine the attenuation amounts of the plurality of variable attenuators 9 to 12 which attenuate the signals supplied from LNAs 5 to 8. Namely, the variable attenuator 9 attenuates a signal supplied from LNA 5 at the attenuation level corresponding to the level of a signal C_ANT1 supplied from the demodulator 15. The variable attenuator 10 attenuates a signal supplied from LNA 6 at the attenuation level corresponding to the level of a signal C_ANT2 supplied from the demodulator 15. The variable attenuator 11 attenuates a signal supplied from LNA 7 at the attenuation level corresponding to the level of a signal C_ANT3 supplied from the demodulator 15. The variable attenuator 12 attenuates a signal supplied from LNA 8 at the attenuation level corresponding to the level of a signal C_ANT4 supplied from the demodulator 15.

For example, if the levels of the signals C_ANT1 to C_ANT4 are high, the attenuation amounts of the variable attenuators 9 to 12 are large, whereas if the levels are low, the attenuation amounts are small. If the levels of the signals C_ANT1 to C_ANT4 are lowest, the attenuation amounts of the variable attenuators 9 to 12 are zero.

The mixer 13 adds together the received signals supplied from the variable attenuators 9 to 12 to synthesize them.

The mixer 13 sends the signal obtained by synthesizing the received signals to the tuner 14.

The tuner 14 is constituted of a down-converter, a band-pass filter and the like, selects the received signal which transmitted a desired digital signal, and converts it into an intermediate frequency (IF) signal. The tuner 14 measures the level of the received signal from the amplitude of the received signal supplied from the mixer 13, generates a signal RSSI having a signal level corresponding to the received signal level, and sends it to the demodulator 15.

The demodulator 15 is constituted of an orthogonal detector, an analog/digital (A/D) converter, a fast Fourier transform (FFT) circuit and the like. The demodulator 15 demodulates the IF signal derived by the tuner 14 to obtain a digital signal transmitted by orthogonal frequency division multiplex, this digital signal being output as demodulated data.

The demodulator 15 generates a signal FFT_WINDOW Synchronized with the received signal subjected to orthogonal frequency division multiplex to thereby define an execution timing of a process of demodulating the received signal.

For example, if the signal FFT_WINDOW takes a high level "Hi", the demodulator 15 demodulates the received signal to obtain a digital signal through fast Fourier transform and signal equalizing. On the other hand, if the signal FFT_WINDOW takes a low level "Low", the demodulator 15 does not demodulate the received signal to obtain a digital signal.

The demodulator 15 also generates the control signals C_ANT1 to C_ANT4 for the variable attenuators 9 to 12 and supplies them to the variable attenuators 9 to 12 to control the attenuation amounts of the signals received at the antennas 1 to 4.

Next, description will be made on the operation of the diversity receiver 100 according to the embodiment of the invention.

The plurality of antennas 1 to 4 receive RF signals subjected to orthogonal frequency division multiplex on a transmission side and transmitted as a radio wave.

The signals received at the plurality of antennas 1 to 4 are supplied to LNAs 5 to 8 whereat the received signals are amplified and sent to the variable attenuators 9 to 12.

The variable attenuators 9 to 12 attenuate the signals received at the plurality of antennas 1 to 4 by the attenuation amounts corresponding to the levels of the signals C_ANT1 to C_ANT4 supplied from the demodulator 15, and send the attenuated received signals to the mixer 13.

The mixer 13 synthesizes the received signals supplied from the variable attenuators 9 to 12 and sends the synthesized signal to the tuner 14.

The tuner 14 derives a received signal in a transmission band of a desired digital signal from the signal synthesized by the mixer 13, converts it into an IF signal, and sends it to the demodulator 15. In this case, the tuner 14 measures a received signal level from the amplitude of the received signal to generate a reception level signal RSSI which is sent to the demodulator 15.

The demodulator 15 demodulates the received signal to obtain the transmitted digital signal by performing or not performing the demodulation operation in accordance with the level of the signal FFT_WINDOW.

For example, if the signal FFT_WINDOW takes a high level "Hi", the demodulator 15 demodulates the received signal to obtain a digital signal through fast Fourier transform and signal equalizing. On the other hand, if the signal FFT_WINDOW takes a low level "Low", the demodulator 15 does not demodulate the received signal to obtain a digital signal.

The demodulator 15 generates the signals C_ANT1 to C_ANT4 and sends them to the variable attenuators 9 to 12 to control the attenuation amounts of the signals at the variable attenuators 9 to 12.

In this case, the demodulator 15 measures a change in the reception level when the attenuation amount of one of the variable attenuators 9 to 12 is changed, during the period corresponding to the guard interval section of the received signal. The attenuation amount capable of improving the reception state can therefore be identified.

It is assumed for example that the attenuation amount of the variable attenuator 9 is largest and the attenuation amount of at least one of the variable attenuators 10 to 12 is zero.

In this case, the level of the signal C_ANT1 supplied from the demodulator 15 to the variable attenuator 9 is highest.

During the period corresponding to the first arriving guard interval section, i.e., during the period while the signal FFT_WINDOW takes first the "Low" level, the demodulator 15 changes the level of the signal C_ANT1 to be supplied to the variable attenuator 9, to the lowest level. The attenuation amount of the variable attenuator 9 becomes therefore zero, and the signal received at the antenna 1 is supplied to the mixer 13 without being attenuated by the variable attenuator 9.

The tuner 14 measures a received signal level from the amplitude of the received signal synthesized by the mixer 13, changes the level of the signal RSSI in accordance with the received signal level, and sends the signal RSSI to the demodulator 15.

The demodulator 15 judges from the level change in the signal RSSI whether the received signal level rises or not.

At the end timing of the period corresponding to the first arriving guard interval section, i.e., at the timing when the signal FFT_WINDOW changes from "Low" to high, the demodulator 15 reverts to (restores) the highest level as the level of the signal C_ANT1 to be sent to the variable attenuator 9. The attenuation amount of the variable attenuator 9 is therefore reverted to the highest level.

After the reception level is measured by changing the attenuation amount of the variable attenuator 9 and when the next effective symbol section arrives, the attenuation amount to be set to the variable attenuator 9 reverts to (restores) the attenuation amount set to the preceding effective symbol section.

In this manner, it is possible to prevent an increase in errors of a signal equalizing process to be executed by the demodulator 15 to demodulate the received signal and obtain the transmitted digital signal. Namely, a change in the reception level when the attenuation amount of the variable attenuator 9 is changed, while the stable reception state is maintained.

If the demodulator 15 judges that a change in the attenuation amount of the variable attenuator 9 rises the reception level, the demodulator 15 changes stepwise the attenuation amount of the variable attenuator 9 each time the period corresponding to the guard interval section arrives, i.e., each time the period while the signal FFT_WINDOW takes "Low" arrives.

More specifically, the demodulator 15 lowers by a predetermined amount the level of the signal C_ANT1 to be supplied to the variable attenuator 9 when the period corresponding to the guard interval section arrives.

The magnitude of the level of the signal C_ANT1 to be lowered by the demodulator 15 each time when the period corresponding to the guard interval section arrives, is set in the range not destructing the reception state, while considering the influence of errors in the signal equalizing process to be executed by the demodulator 15 to demodulate the received signal and obtain the transmitted digital signal.

Similarly, thereafter each time the period corresponding to the guard interval section arrives, the attenuation amount of the variable attenuator 9 is stepwise reduced by lowering by the predetermined amount the level of the signal C_ANT1 to be supplied to the variable attenuator 9.

It is therefore possible to prevent an increase in errors of a signal equalizing process to be executed by the demodulator 15 during the effective symbol section to demodulate the received signal and obtain a digital signal. A more appropriate attenuation amount can therefore be set while maintaining the stable reception state. It is thus possible to stably receive a signal subjected to orthogonal frequency division multiplex and properly demodulate the received signal and obtain a digital signal.

Figure 2:
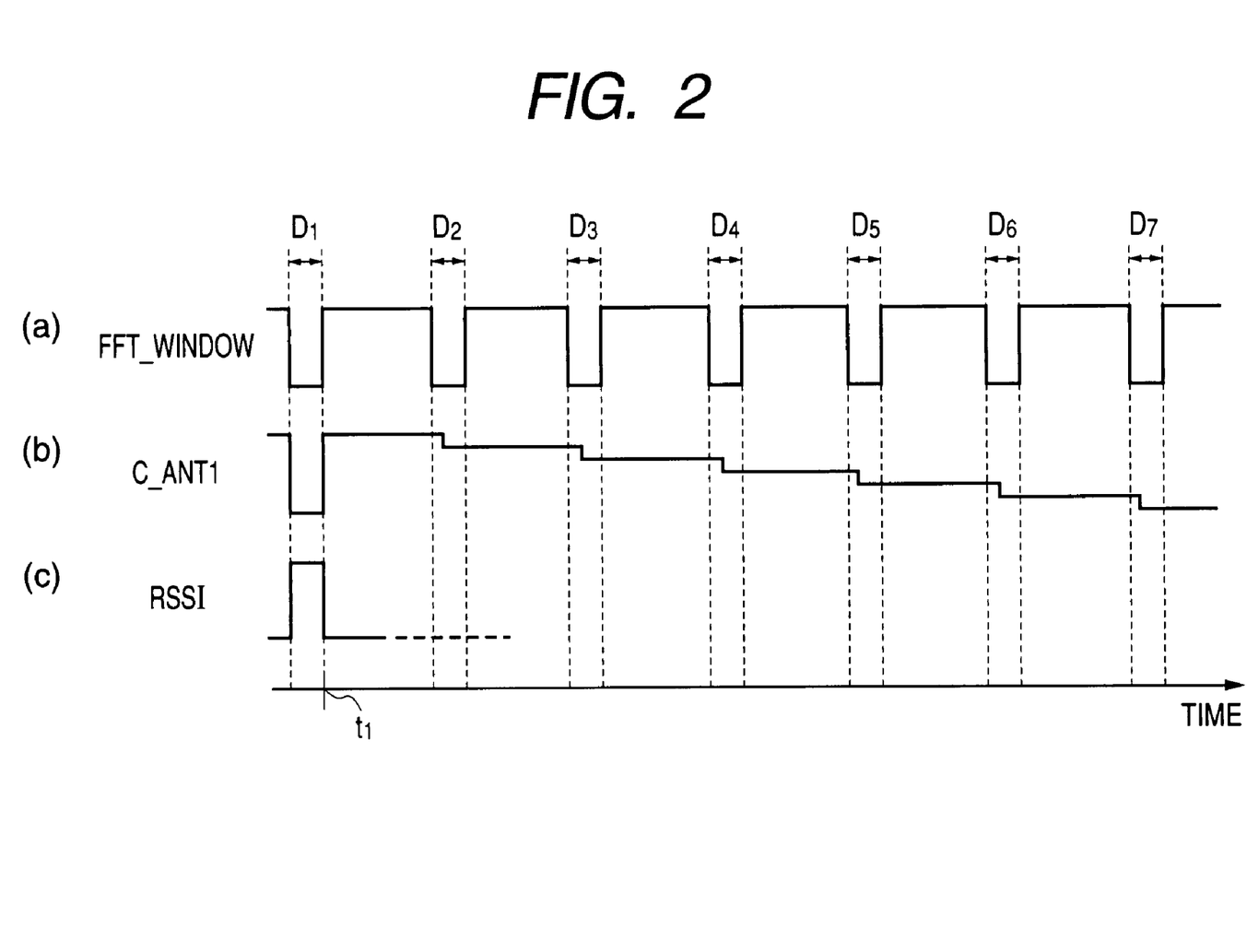
FIG. 2 is a timing chart illustrating the operation of the diversity receiver of the embodiment.

More specifically, it is assumed for example that as the demodulator 15 changes the attenuation amount of the variable attenuator 9 in accordance with the signal C_ANT1 shown in the time chart of FIG. 2(b), during the period $D_1$ identified by the signal FFT_WINDOW shown in the time chart of FIG. 2(a) corresponding to the first arriving guide interval section, the level of the signal RSSI rises as shown in the time chart of FIG. 2(c).

The demodulator 15 changes the signal C_ANT1 to revert to the largest attenuation amount of the variable attenuator 9 at the end timing $t_1$ of the period $D_1$ corresponding to the first arriving guard interval section.

During periods $D_2, D_3, \ldots, D_7$ corresponding to the succeedingly arriving guard interval sections, the demodulator 15 reduces stepwise the attenuation amount of the variable attenuator 9 to eventually take a value near the minimum attenuation value. The demodulator 15 can therefore set the attenuation amount at which more reliable reception is possible, during the period corresponding to the effective symbol section, i.e., during the period while the signal FFT_WINDOW is "Hi", while suppressing the generation of errors in a signal equalizing process to be executed by the demodulator 15 to demodulate the received signal and obtain a digital signal.

The demodulator 15 judges from the level change in the signal RSSI whether the reception level rises. If the demodulator 15 judges that the reception level did not rise, the demodulator 15 does not change the attenuation amount of the variable attenuator 9 even if the period corresponding to the succeeding guard interval section arrives. Namely, the demodulator 15 judges that the reception state cannot be improved even if the attenuation amount of the variable attenuator 9 is changed. In this case, the demodulator 15 changes the attenuation amount of one of the other variable attenuators 10 to 12 and measures the reception level, or the demodulator 15 terminates the process itself of changing the attenuation amount and measuring the reception level.

Figure 3:
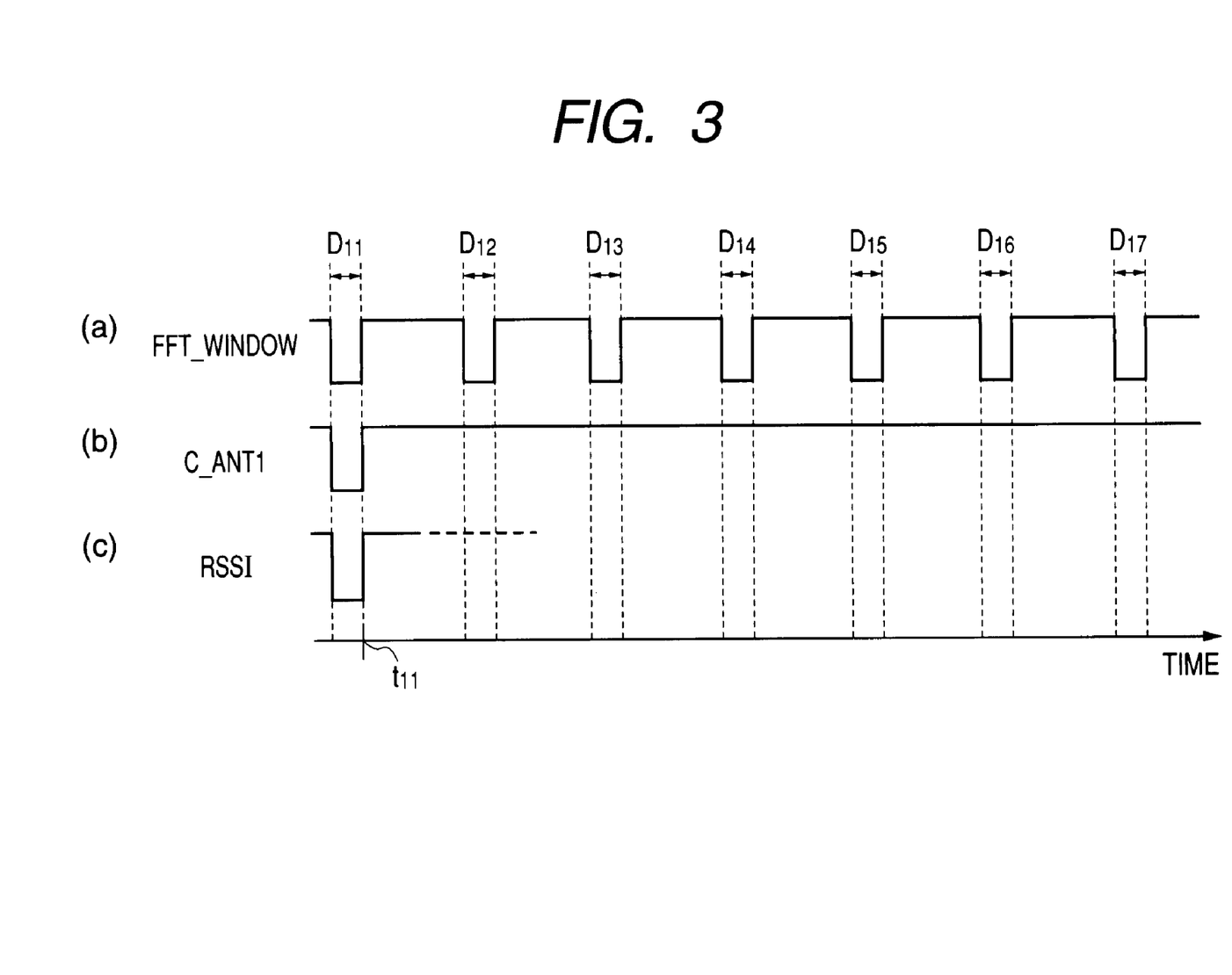
FIG. 3 is a timing chart illustrating the operation of the diversity receiver of the embodiment.

More specifically, it is assumed for example that as the demodulator 15 changes the attenuation amount of the variable attenuator 9 in accordance with the signal C_ANT1 shown in the time chart of FIG. 3(b), during the period $D_{11}$ identified by the signal FFT_WINDOW shown in the time chart of FIG. 3(a) corresponding to the first arriving guide interval section, the level of the signal RSSI lowers as shown in the time chart of FIG. 3(c).

The demodulator 15 changes the signal C_ANT1 to revert to the largest attenuation amount of the variable attenuator 9 at the end timing $t_{11}$ of the period $D_{11}$ corresponding to the first arriving guard interval section.

During periods $D_{12}, D_{13}, \ldots, D_{17}$ corresponding to the succeedingly arriving guard interval sections, the demodulator 15 does not change the attenuation amount of the variable attenuator 9. In this case, the demodulator 15 changes the attenuation amount of one of the other variable attenuators 10 to 12 and measures the reception level, or the demodulator 15 terminates the process itself of changing the attenuation amount and measuring the reception level.

It is assumed for example that the attenuation amount of the variable attenuator 9 is zero and the attenuation amount of at least one of the variable attenuators 10 to 12 is zero.

In this case, the level of the signal C_ANT1 supplied from the demodulator 15 to the variable attenuator 9 is lowest.

During the period corresponding to the first arriving guard interval section, i.e., during the period while the signal FFT_WINDOW takes first the "Low" level, the demodulator 15 changes the level of the signal C_ANT1 to be supplied to the variable attenuator 9, to the highest level. The attenuation amount of the variable attenuator 9 becomes therefore largest, and the signal received at the antenna 1 is attenuated greatly by the variable attenuator 9 and thereafter supplied to the mixer 13.

The tuner 14 measures a received signal level from the amplitude of the received signal synthesized by the mixer 13, changes the level of the signal RSSI in accordance with the received signal level, and sends the signal RSSI to the demodulator 15.

The demodulator 15 judges from the level change in the signal RSSI whether the received signal level rises or not.

At the end timing of the period corresponding to the first arriving guard interval section, i.e., at the timing when the signal FFT_WINDOW changes from "Low" to high, the demodulator 15 reverts to (restores) the zero level as the level of the signal C_ANT1 to be sent to the variable attenuator 9. The attenuation amount of the variable attenuator 9 is therefore reverted to the zero level.

If the demodulator 15 judges that a change in the attenuation amount of the variable attenuator 9 rises the reception level, the demodulator 15 changes stepwise the attenuation amount of the variable attenuator 9 each time the period corresponding to the guard interval section arrives, i.e., each time the period while the signal FFT_WINDOW takes "Hi" arrives.

More specifically, the demodulator 15 raises by a predetermined amount the level of the signal C_ANT1 to be supplied to the variable attenuator 9 when the period corresponding to the next guard interval section arrives.

The magnitude of the level of the signal C_ANT1 to be raised by the demodulator 15 each time when the period corresponding to the guard interval section arrives, is set in the range not destructing the reception state, while considering the influence of errors in the signal equalizing process to be executed by the demodulator 15 to demodulate the received signal and obtain the transmitted digital signal.

Similarly, thereafter each time the period corresponding to the guard interval section arrives, the attenuation amount of the variable attenuator 9 is stepwise raised by raising by the predetermined amount the level of the signal C_ANT1 to be supplied to the variable attenuator 9.

It is therefore possible to prevent an increase in errors of a signal equalizing process to be executed by the demodulator 15 during the effective symbol section to demodulate the received signal and obtain a digital signal. A more appropriate attenuation amount can therefore be set while maintaining the stable reception state. It is thus possible to stably receive a signal subjected to orthogonal frequency division multiplex and properly demodulate the received signal and obtain a digital signal.

Figure 4:
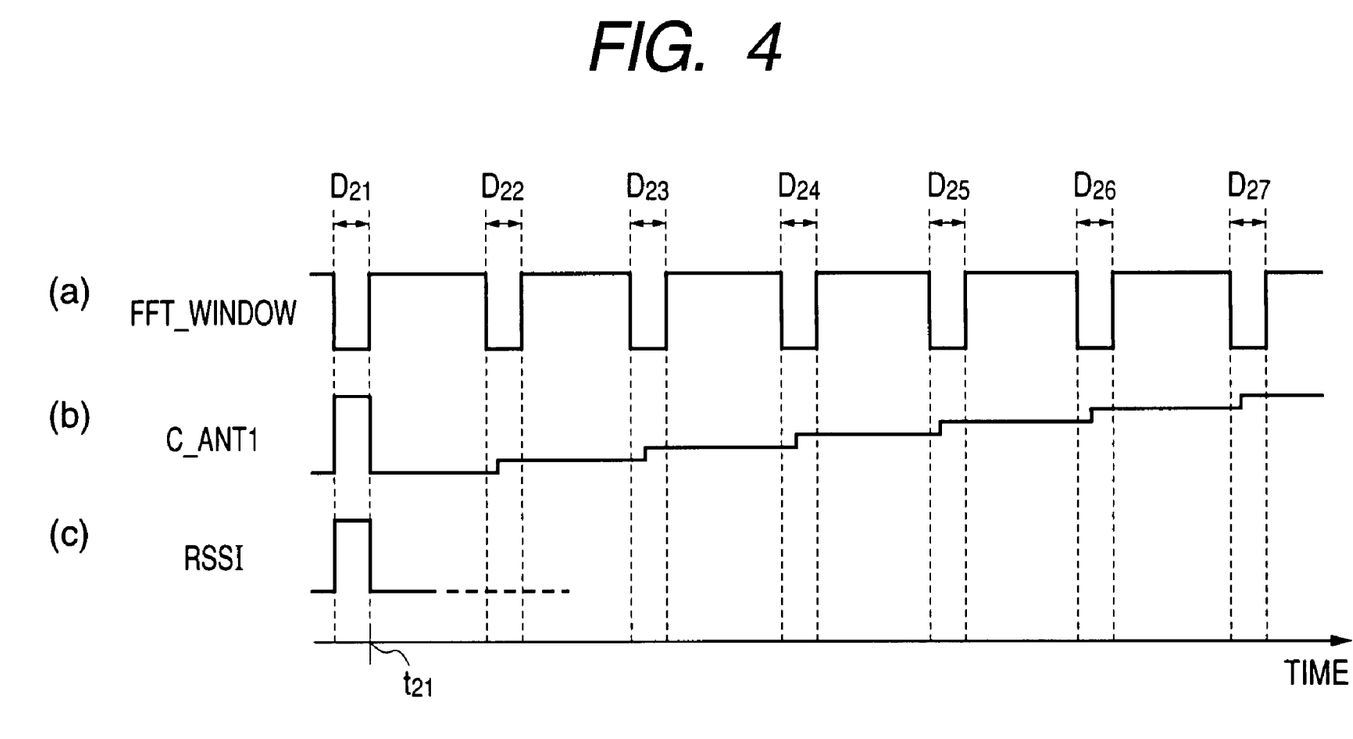
FIG. 4 is a timing chart illustrating the operation of the diversity receiver of the embodiment.

More specifically, it is assumed for example that as the demodulator 15 changes the attenuation amount of the variable attenuator 9 in accordance with the signal C_ANT1 shown in the time chart of FIG. 4(b), during the period $D_{21}$ identified by the signal FFT_WINDOW shown in the time chart of FIG. 4(a) corresponding to the first arriving guide interval section, the level of the signal RSSI rises as shown in the time chart of FIG. 4(c).

The demodulator 15 changes the signal C_ANT1 to revert to the smallest attenuation amount of the variable attenuator 9 at the end timing $t_{21}$ of the period $D_{21}$ corresponding to the first arriving guard interval section.

During periods $D_{22}$, $D_{23}$, . . . , $D_{27}$ corresponding to the succeedingly arriving guard interval sections, the demodulator 15 increases stepwise the attenuation amount of the variable attenuator 9 to eventually take a value near the maximum attenuation value. The demodulator 15 can therefore set the attenuation amount at which more reliable reception is possible, during the period corresponding to the effective symbol section, i.e., during the period while the signal FFT_WINDOW is "Hi", while suppressing the generation of errors in a signal equalizing process to be executed by the demodulator 15 to demodulate the received signal and obtain a digital signal.

The demodulator 15 judges from the level change in the signal RSSI whether the reception level rises or not. If the demodulator 15 judges that the reception level did not rise, the demodulator 15 does not change the attenuation amount of the variable attenuator 9 even if the period corresponding to the succeeding guard interval section arrives. Namely, the demodulator 15 judges that the reception state cannot be improved even if the attenuation amount of the variable attenuator 9 is changed. In this case, the demodulator 15 changes the attenuation amount of one of the other variable attenuators 10 to 12 and measures the reception level, or the demodulator 15 terminates the process itself of changing the attenuation amount and measuring the reception level.

Figure 5:
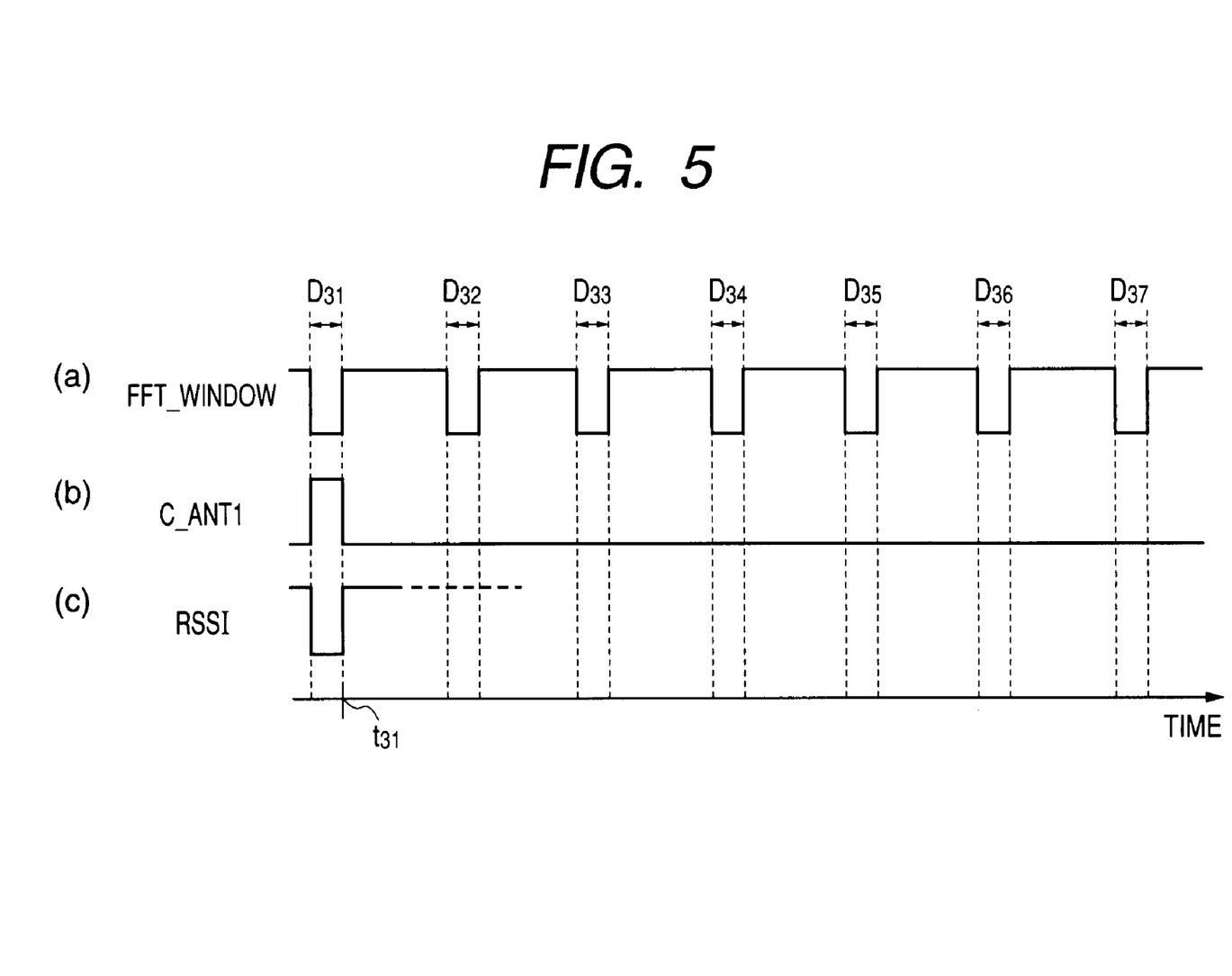
FIG. 5 is a timing chart illustrating the operation of the diversity receiver of the embodiment.

More specifically, it is assumed for example that as the demodulator 15 changes the attenuation amount of the variable attenuator 9 in accordance with the signal C_ANT1 shown in the time chart of FIG. 5(b), during the period $D_{31}$ identified by the signal FFT_WINDOW shown in the time chart of FIG. 5(a) corresponding to the first arriving guide interval section, the level of the signal RSSI lowers as shown in the time chart of FIG. 5(c).

The demodulator 15 changes the signal C_ANT1 to revert to the smallest attenuation amount of the variable attenuator 9 at the end timing $t_{31}$ of the period $D_{31}$ corresponding to the first arriving guard interval section.

During periods $D_{32}$, $D_{33}$, . . . , $D_{37}$ corresponding to the succeedingly arriving guard interval sections, the demodulator 15 does not change the attenuation amount of the variable attenuator 9. In this case, the demodulator 15 changes the attenuation amount of one of the other variable attenuators 10 to 12 and measures the reception level, or the demodulator 15 terminates the process itself of changing the attenuation amount and measuring the reception level.

For the variable attenuators 10 to 12, similar to the variable attenuator 9, the demodulator 15 changes the attenuation amount and measures the reception level. It is therefore possible to set a proper attenuation amount.

The demodulator 15 controls the attenuation amounts of the variable attenuators 9 to 12 in such a manner that the attenuation amount of at least one of the variable attenuators 9 to 12 becomes zero.

In the example described above, it is assumed that the guard interval section of a received signal is relatively long. As the demodulator 15 changes the attenuation amount of the variable attenuator 9 or the like, the level of the signal RSSI changes immediately so that a change in the reception level can be measured.

If the guard interval section of a received signal is short, even if the attenuation amount of a received signal is changed, the level of the signal RSSI may not change in the guard interval section so that a change in the reception level may not be judged immediately.

In this context, the demodulator 15 may change the attenuation amount of the variable attenuator 9 or the like at a longer switching period and measure the reception level. For example, the reception level is measured by changing the attenuation level each time the period corresponding to the guard interval section, i.e., the period while the signal FFT_WINDOW is "Low", arrives twice.

In this case, the demodulator 15 controls the attenuation amount by using the signals C_ANT1 to C_ANT4, FFT_WINDOW and RSSI and in addition, for example, signals D_RSSI, MIX_GAIN and ATT_DIR1 to ATT_DIR4.

The demodulator 15 samples the signal RSSI supplied from the tuner 14 at the timing when the period corresponding to the guard interval section arrives, e.g., at the falling timing of the signal FFT_WINDOW, to thereby measure the reception level. Namely, the demodulator 15 samples the signal RSSI at the symbol period of a received signal to measure the reception level.

The signal D_RSSI is a signal indicative of a difference between the level of the signal RSSI sampled presently by the demodulator 15 and the level of the signal RSSI sampled precedingly.

The signal MIX_GAIN is a signal indicative of a difference between the level of the signal D_RSSI when the attenuation amount of one of the variable attenuators 9 to 12 is not changed and the level of the signal D_RSSI when the attenuation amount is changed.

The signals ATT_DIR1 to ATT_DIR4 are signals for designating the control directions of the attenuation amounts of the variable attenuators 9 to 12.

Each of the signals ATT_DIR1 to ATT_DIR4 instructs whether the attenuation amount of each of the variable attenuators 9 to 12 is controlled in an attenuation amount increase direction or in an attenuation amount decrease direction, in accordance with the level of each of the signals ATT_DIR1 to ATT_DIR4.

It is assumed for example that the attenuation amount of the variable attenuator 9 is largest and the attenuation amount of at least one of the variable attenuators 10 to 12 is zero.

Figure 6:
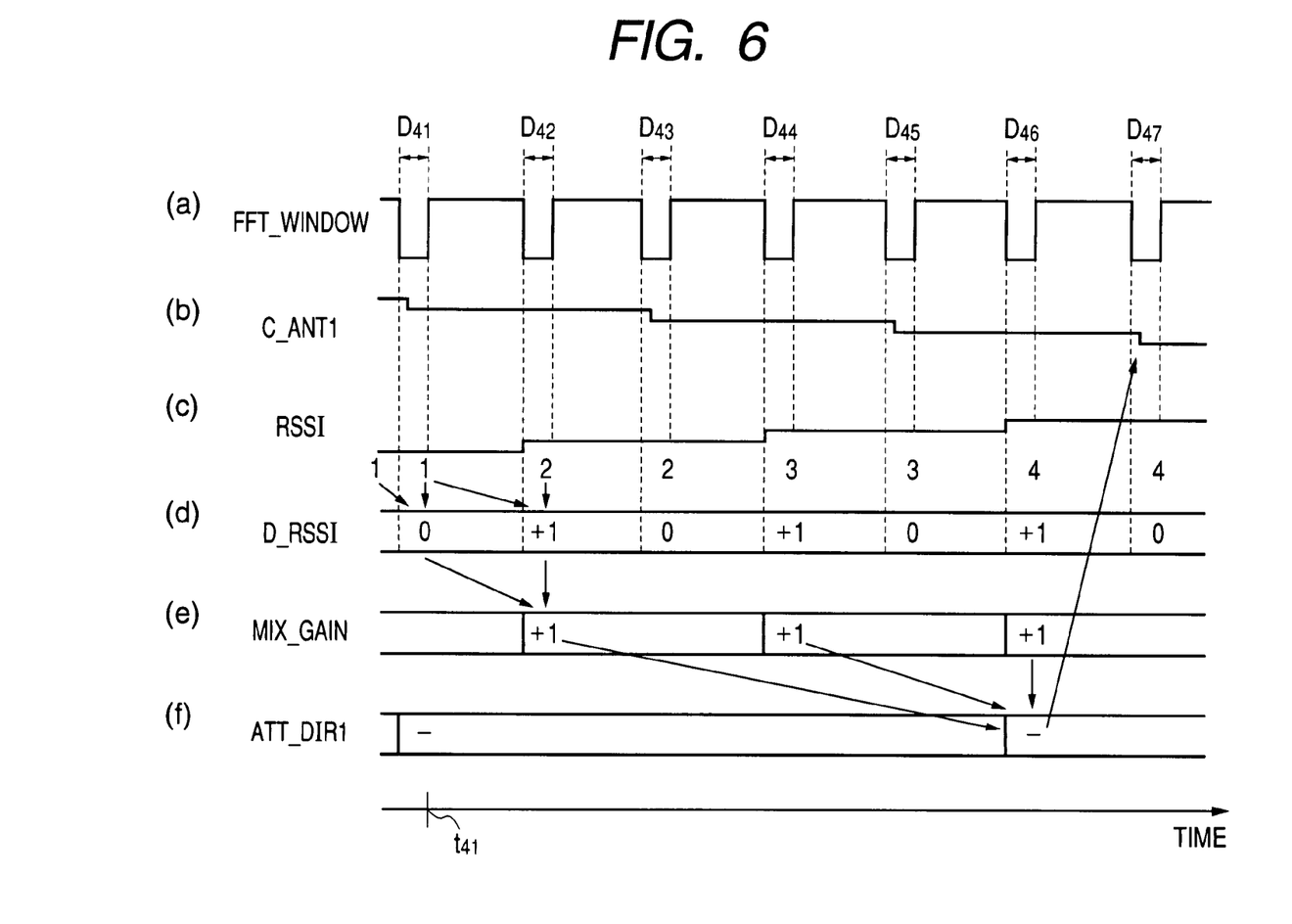
FIG. 6 is a timing chart illustrating the operation of the diversity receiver of the embodiment.

In this case, the level of the signal C_ANT1 supplied from the demodulator 15 to the variable attenuator 9 is highest as shown in the period before the period $D_{41}$ shown in FIG. 6(b).

During the period $D_{41}$ corresponding to the first arriving guard interval section, the demodulator 15 lowers by a predetermined amount the level of the signal C_ANT1 to be supplied to the variable attenuator 9. The demodulator 15 samples the signal RSSI supplied from the tuner 14 and measures the reception level.

As the period $D_{42}$ corresponding to the next guard interval section arrives, the demodulator 15 samples the signal RSSI supplied from the tuner 14 and measures the reception level. The measured reception level corresponds to the reception level changed in response to a change in the attenuation amount of the variable attenuator 9 during the period $D_{41}$.

The demodulator 15 generates the signal D_RSSI indicative of a difference between the reception level measured during the period $D_{41}$ and the reception level measured during the period $D_{42}$.

As shown in the time chart of FIG. 6(c), it is assumed that the reception level is "1" as measured during the period $D_{41}$ from the signal RSSI and the reception level is "2" as measured during the period $D_{42}$.

During the period $D_{42}$, the demodulator 15 sets the signal D_RSSI to "+1" indicative of a difference between the two reception levels.

Similarly, during the periods $D_{43}$, $D_{44}$, . . . , $D_{47}$, the demodulator 15 measures the reception level and sets the signal D_RSSI.

The demodulator 15 executes a process of setting the signal MIX_GAIN during the period during which the reception level changed in response to a change in the attenuation amount of the variable attenuator 9.

The demodulator 15 sets during the period $D_{42}$ the signal MIX_GAIN indicative of a difference between the level of the signal D_RSSI set during the period $D_{41}$ corresponding to no change of the attenuation amount of the variable attenuator 9 and the level of the signal D_RSSI set during the period $D_{42}$.

As shown in the time chart of FIG. 6(d), the level of the signal D_RSSI set during the period $D_{41}$ is "0" and the level of the signal D_RSSI set during the period $D_{42}$ is "1". During the period $D_{42}$, the demodulator 15 sets the signal MIX_GAIN to "+1" indicative of the difference between two signals D_RSSI.

Similarly, during the periods $D_{44}$ and $D_{46}$, the demodulator 15 sets the signals MIX_GAIN corresponding to the difference between the levels of the signals D_RSSI.

After the signals MIX-GAIN are set a predetermined number of times, the demodulator 15 generates the signal ATT_DIR1 in accordance with the levels of the signals MIX_GAIN set previously.

For example, after the signal MIX_GAIN is set three times during the periods $D_{42}$, $D_{44}$ and $D_{46}$, the demodulator 15 sets the signal ATT_DIR1 during the period $D_{46}$. Since all the signals MIX_GAIN set during the periods $D_{42}$, $D_{44}$ and $D_{46}$ are "+1" indicating a rise of the reception level, the demodulator 15 sets during the period $D_{46}$ the signal ATT_DIR1 to "−" indicating a decreasing direction of the attenuation amount as the control direction of the attenuation amount of the variable attenuator 9.

After the signal ATT_DIR1 is set, the demodulator 15 further reduces the attenuation amount of the variable attenuator 9 in accordance with the signal ATT_DIR1 during the period $D_{47}$ corresponding to the next arriving guard interval section. Thereafter, the demodulator 15 reduces stepwise the attenuation amount of the variable attenuator 9 to set a proper attenuation amount.

As described above, the period corresponding to the guard interval section is classified into the period during which the attenuation amount of the variable attenuator 9 is changed and the period during which the reception level changed in response to a change in the attenuation amount of the variable attenuator 9 is measured. The attenuation amount of the variable attenuator 9 is changed in accordance with the measurement results of the reception levels.

It is therefore possible to correctly measure the reception level and maintain stable reception even if the guard interval section is short.

Figure 7:
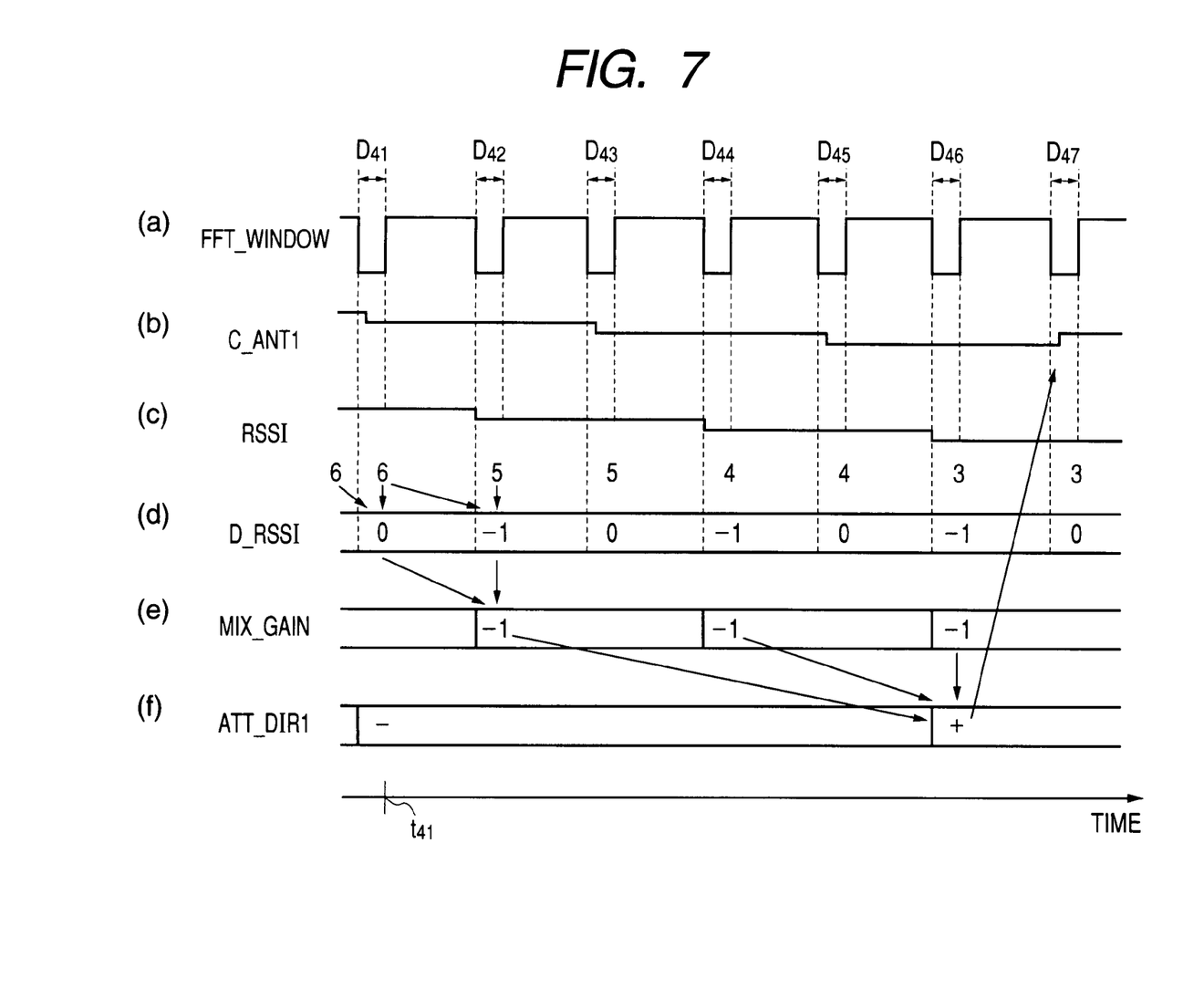
FIG. 7 is a timing chart illustrating the operation of the diversity receiver of the embodiment.

As shown in the time chart of FIG. 7(c), it is assumed that the reception level measured from the signal RSSI during the period $D_{41}$ is "6" and the reception level measured from the signal RSSI during the period $D_{42}$ is "5".

In this case, the demodulator 15 sets the signal D_RSSI to "−1" indicating a difference between two reception levels.

Similarly, during the periods $D_{43}$, $D_{44}$, . . . , $D_{47}$, the demodulator 15 measures the reception level and sets the signal D_RSSI.

The demodulator 15 executes a process of setting the signal MIX_GAIN during the period during which the reception level changed in response to a change in the attenuation amount of the variable attenuator 9 is measured.

For example, as shown in the time chart of FIG. 7(d), the level of the signal D_RSSI set during the period $D_{41}$ is "0" and the level of the signal D_RSSI set during the period $D_{42}$ is "−1". During the period $D_{42}$, the demodulator 15 sets the signal MIX_GAIN to "−1" indicative of the difference between two signals D_RSSI.

Similarly, during the periods $D_{44}$ and $D_{46}$, the demodulator 15 sets the signals MIX_GAIN corresponding to the difference between the levels of the signals D_RSSI.

Since all the signals MIX GAIN set during the periods $D_{42}$, $D_{44}$ and $D_{46}$ are "−1" indicating a fall of the reception level, the demodulator 15 sets during the period $D_{46}$ the signal ATT_DIR1 to "+" indicating an increasing direction of the attenuation amount as the control direction of the attenuation amount of the variable attenuator 9.

After the signal ATT_DIR1 is set, the demodulator 15 further increases the attenuation amount of the variable attenuator 9 in accordance with the signal ATT_DIR1 during the period $D_{47}$ corresponding to the next arriving guard interval section. Thereafter, the demodulator 15 increases stepwise the attenuation amount of the variable attenuator 9 to set a proper attenuation amount.

As described above, the attenuation amount can be set in accordance with the measurement results of the reception level after the attenuation amount of the variable attenuator 9 is changed. It is therefore possible to stably receive the signal subjected to orthogonal frequency division multiplex.

For the variable attenuators 10 to 12, similar to the variable attenuator 9, the demodulator 15 changes the attenuation amount and measures the reception level so that a proper attenuation amount can be set.

The demodulator 15 controls the attenuation amounts of the variable attenuators 9 to 12 in such a manner that the attenuation amount of at least one of the variable attenuators 9 to 12 becomes zero.

As described above, according to the invention, during the period corresponding to the guard interval section, the attenuation amount is changed and the reception level is measured. If a rise of the reception level is detected, the attenuation amount is changed stepwise during the period corresponding to the succeedingly arriving guard interval section.

It is possible to set a more appropriate attenuation amount while suppressing the generation of errors in a signal equalizing process to be executed to demodulate a received signal and obtain a digital signal. It is possible to stably receive the signal subjected to orthogonal frequency division multiplex.

As described so far, according to the present invention, the attenuation amount of at least one attenuation means is set to "zero" and the attenuation amounts of other attenuation means are sequentially changed to judge whether the attenuation amount of any attenuation means is set to "zero" or not. Description will be given on an effective approach to performing such an attenuation change and judgment process.

The demodulator 15 has an antenna control pointer 16 and an antenna fix pointer 17.

The antenna control pointer 16 is used for designating one of the variable attenuators 9 to 12 whose attenuation amount is to be changed.

The antenna control pointer 16 designates one of the variable attenuators 9 to 12 whose attenuation amount is to be changed, for example, by storing data representative of the variable attenuator to be designated in a semiconductor memory.

The antenna fix pointer 17 designates one of the variable attenuators 9 to 12 whose attenuation amount is fixed to zero during the attenuation change control.

The antenna fix pointer 17 designates one of the variable attenuators 9 to 12 whose attenuation amount is to be fixed to zero during the reception level measurement and the like through the attenuation amount change control and reception level measurement, for example, by storing data representative of the variable attenuator to be designated in a semiconductor memory.

The demodulator 15 executes a digital signal demodulation process such as fast Fourier transform and signal equalizing by detecting an effective symbol section of a received signal.

The demodulator 15 generates the signals C_ANT1 to C_ANT4 and send them to the variable attenuators 9 to 12 to control the attenuation amount of each of the variable attenuators 9 to 12.

In order to improve the reception state, the demodulator 15 sequentially switches among the variable attenuators 9 to 12 whose attenuation amount is changed, measures a change in the reception level to be caused by changing the attenuation amount, and performs other operations to thereby set a proper attenuation amount.

In this case, in order to prevent the reception level from being lowered, the demodulator 15 controls the attenuation amount of each of the variable attenuators 9 to 12 in such a manner that the attenuation amount of at least one of the variable attenuators becomes zero.

More specifically, by using the antenna fix pointer 17, the demodulator 15 designates one of the variable attenuators 9 to 12 whose attenuation amount is always zero even while the attenuation amount change control process is performed.

Figure 8:
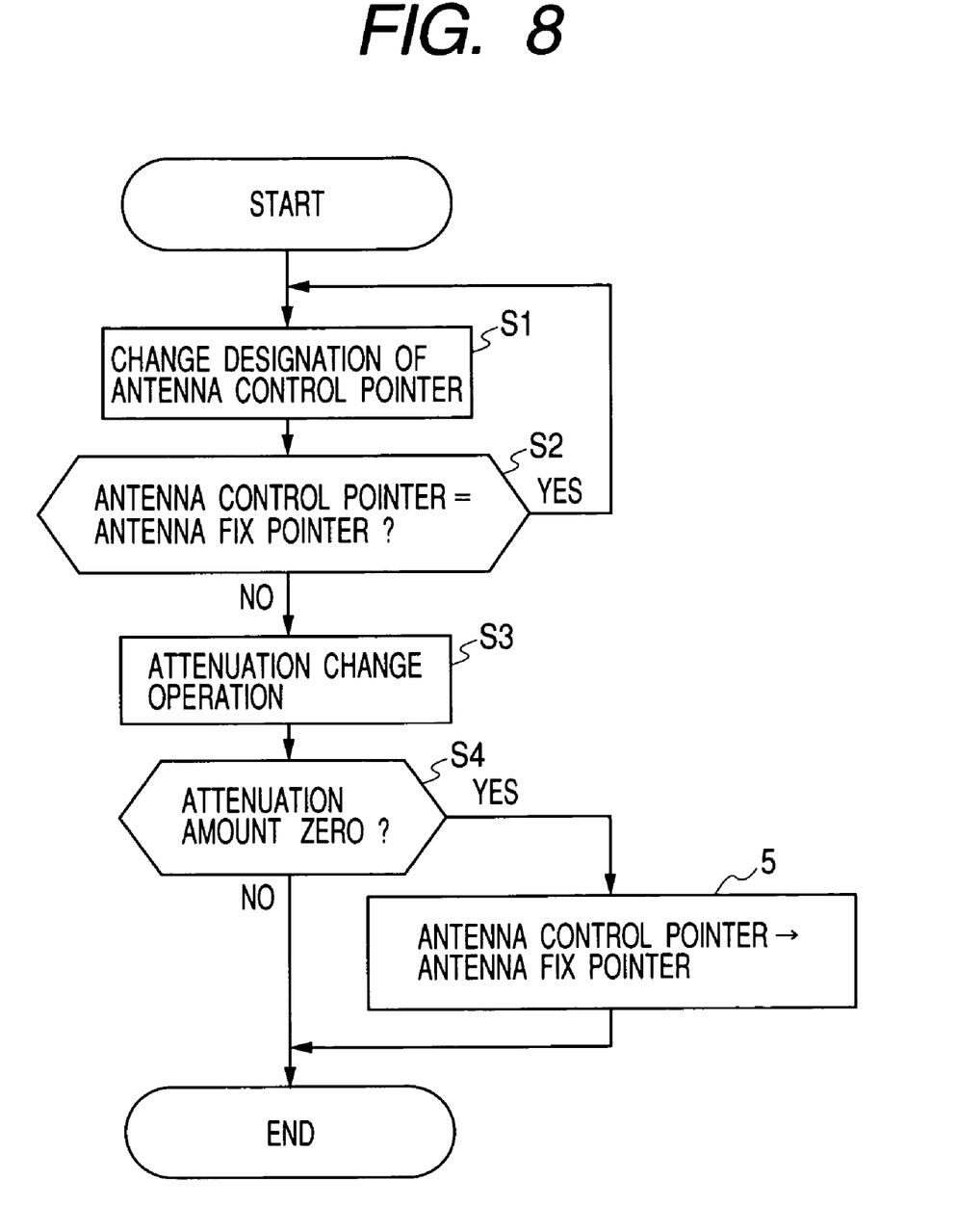
FIG. 8 is a flow chart illustrating the operation of a demodulator to control the attenuation amount of each variable attenuator.

With reference to the flow chart shown in FIG. 8, description will be given on the attenuation amount change control process to be executed by the demodulator 15 for the variable attenuators 9 to 12.

After the demodulator 15 identifies one of the variable attenuators 9 to 12 whose attenuation amount is to be changed, the demodulator 15 changes the variable attenuator designated by the antenna control pointer 16 to the identified variable attenuator whose attenuation amount is to be changed (Step S).

The demodulator 15 checks whether or not the variable attenuator designated by the antenna control pointer 16 is the variable attenuator designated by the antenna fix pointer 17 (Step S).

If the demodulator 15 judges that the variable attenuators designated by the two pointers are the same (YES at Step S2), the process returns to Step S1 whereat the variable attenuator designated by the antenna control pointer 16 is again changed.

Namely, if the variable attenuator set to the antenna control pointer 16 is the same as the variable attenuator designated by the antenna fix pointer 17, the demodulator 15 changes the variable attenuator whose attenuation amount is to be changed, to another variable attenuator.

In this manner, the demodulator 15 is constrained not to change the attenuation amount of one of the variable attenuators 9 to 12 designated by the antenna fix pointer 17.

If the demodulator 15 judges that the variable attenuators designated by the antenna control pointer 16 and antenna fix pointer 17 are different (NO at Step S2), the demodulator 15 executes an attenuation amount change process (Step S3).

The demodulator 15 changes the attenuation amount of one of the variable attenuators 9 to 12 designated by the antenna control pointer 16, for example, by changing the level of one of the signals C-ANT1 to C_ANT4. The demodulator 15 sets a more proper attenuation amount, for example, by measuring the reception level from the signal RSSI sent from the tuner 14.

It is therefore possible to set a more proper attenuation amount by changing the attenuation amount while the attenuation amount of at least one of the variable attenuators 9 to 12 is fixed to zero. A signal subjected to orthogonal frequency division multiplex can therefore be received stably.

The demodulator 15 checks whether or not the attenuation amount of the variable attenuator subjected to the attenuation amount change, i.e., the attenuation amount of the variable attenuator designated by the antenna control pointer 16, is zero (Step S4).

If the demodulator 15 judges that the attenuation amount of the variable attenuator designated by the antenna control pointer 16 is zero (YES at Step S4), the demodulator 15 sets the variable attenuator designated by the antenna control pointer 16 to the antenna fix pointer 17 (Step S5).

When the attenuation amount of one of the variable attenuators 9 to 12 is to be changed next, the demodulator 15 can therefore change the variable attenuator whose attenuation amount is fixed to zero and set a more proper attenuation amount.

If the demodulator 15 judges that the attenuation amount of the variable attenuator designated by the antenna control pointer 16 is not zero (NO at Step S4), the demodulator 15 skips Step S5 and terminates the attenuation change control process.

When the attenuation amounts of the variable attenuators 9 to 12 are changed, the attenuation amount is fixed for one of the variable attenuators 9 to 12 designated by the antenna fix pointer 17. With a simple process, while the attenuation amount of at least one of the variable attenuators 9 to 12 is fixed, the attenuation amount is changed to set a more proper attenuation amount. It is therefore possible to prevent the reception level from being lowered while the attenuation amount is changed, and to receive stably a signal subjected to orthogonal frequency division multiplex.

As described so far, according to the present invention, the demodulator 15 changes the attenuation amount of one of the variable attenuators 9 to 12 by fixing the attenuation amount of the variable attenuator designated by the antenna fix pointer 17.

With a simple process, while the attenuation amount of at least one of the variable attenuators 9 to 12 is fixed to zero, the attenuation amount of another variable attenuator is changed so that a signal subjected to orthogonal frequency division multiplex can be received stably.

According to the invention, a received signal is not switched as in a conventional case.

It is therefore possible to prevent the frequency characteristics of a received signal from being changed abruptly and to stably receive a signal subjected to orthogonal frequency division multiplex.

The invention is not limited to the above-described embodiment, but various modifications and applications are possible.

For example, in the embodiment, a radio wave signal is received with four antennas 1 to 4. The number of antennas is not limited to four, but the arbitrary number of antennas may be used to receive a signal subjected to orthogonal frequency division multiplex, while taking into consideration stabilization of the reception characteristics and simplification of the structure.

INDUSTRIAL APPLICABILITY

As described so far, according to the invention, during the period corresponding to the guard interval section, the attenuation amount is changed and a reception level is measured. In accordance with the measured level, the attenuation amount is changed stepwise.

It is possible to properly set the attenuation amount of a received signal and to stably receive a signal subjected to orthogonal frequency division multiplex.

According to the invention, when the attenuation amount of a received signal is to be changed, the antenna control pointer and antenna fix pointer are utilized. For changing the attenuation amounts of a plurality of variable attenuators, the attenuation amount of at least one of the variable attenuators is fixed to zero. A proper attenuation amount can therefore be set with a simple process.

The invention claimed is:

1. A diversity receiver for receiving an orthogonal frequency division multiplex signal by using a plurality of antennas, each of symbol periods of the signal consisting of an effective symbol section and a guard interval section, the diversity receiver comprising:

a plurality of amplification means for individually amplifying a signal received at each of the plurality of antennas, said plurality of amplification means being arranged in parallel so as to correspond to said plurality of antennas in one-to-one correspondence;

a plurality of attenuation means each for individually attenuating each of the received signals amplified by each of said amplification means to generate a plurality of predetermined-level signals, said plurality of attenuation means being arranged in parallel so as to correspond to said plurality of antennas and amplification means in one-to-one correspondence;

signal synthesis means for receiving all said plurality of predetermined-level signals generated by said attenuation means and for combining together these predetermined-level signals to generate a synthesized signal;

control means for individually controlling an attenuation amount of each of said attenuation means, said control means including an antenna fix pointer for instructing to fix to "zero" the attenuation amount of at least one of the plurality of said attenuation means corresponding to the plurality of antennas, and an antenna control pointer for designating an antenna for which the attenuation amount is changed wherein it is judged whether attenuation means designated by the antenna control pointer and attenuation means designated by the antenna fix pointer are identical with each other, and if it is judged that they are identical with each other, the attenuation means whose attenuation amount to be switched is changed to another attenuation means, or if it is judged that they are different from each other, the control means operates to execute an attenuation amount switching process; and demodulation means for demodulating the synthesized signal generated by said synthesis means to obtain a digital signal, wherein said control means operates to adjust the attenuation amount of each of said attenuation means in such a manner that said control means selectively supplies said signal synthesis means with a received signal received by at least one of the plurality of antennas, and if received signals received by at least two of the plurality of antennas are to be supplied, said control means additionally supplies said signal synthesis means with only a received signal or signals contributing to a rise of a level of the synthesized received signal, wherein during a period corresponding to the guard interval section said control means operates to judge whether or not the level of the synthesized received signal rises upon an additional supply of the received signal received at a given antenna, and wherein said control means measures the level of the synthesized received signal by setting the attenuation amount of said attenuation means corresponding to the given antenna to a maximum value or a minimum value, judges whether or not the level of the synthesized received signal rises, and if it is judged that the level rises, changes stepwise the attenuation amount of said attenuation means whose attenuation amount was changed to the maximum value, each time the period corresponding to the guard interval section arrives, so that the attenuation amount is stepwise increased when the set attenuation amount is the maximum value and so that the attenuation amount is stepwise decreased when the set attenuation amount is the minimum value.

2. The diversity receiver according to claim 1, wherein the operation to judge whether or not the level of the synthesized received signal rises is performed by changing the attenuation amount of said attenuation means corresponding to the given antenna during the period corresponding to the guard interval section and measuring a change in the level of the synthesized received signal.

3. The diversity receiver according to claim 2, wherein in accordance with a measurement result of the change in the level of the synthesized received signal caused by changing the attenuation amount of said attenuation means for the given antenna, said control means determines a renewal target attenuation amount of said attenuation means for the given antenna and gradually changes the attenuation amount toward the determined renewal target attenuation amount.

4. The diversity receiver according to claim 3, wherein a change in the attenuation amount toward the renewal target attenuation amount is performed stepwise each time the period corresponding to the guard interval section arrives.

5. The diversity receiver according to claim 2, wherein said control means changes the attenuation amount of said attenuation means corresponding to the given antenna during the period corresponding to the guard interval section, and after the level of the synthesized received signal is measured, changes at an end of the period the attenuation amount of said attenuation means to the attenuation amount before an attenuation amount change.

6. The diversity receiver according to claim 2, wherein said control means gradually changes an attenuation level of said attenuation means whose attenuation amount is to be changed, during a plurality of periods corresponding to a plurality of consecutive guard interval sections, to monitor the change in the level of the synthesized received signal during the plurality of periods.

7. The diversity receiver according to claim 6, wherein said control means measures the level of the synthesized received signal immediately before and after the attenuation amount of said attenuation means whose attenuation amount is to be changed, generates a signal indicative of a difference between levels measured immediately before and after, and accumulating the difference to judge whether or not there is a tendency that the level of the synthesized received signal rises.

8. The diversity receiver according to claim 1, wherein said control means judges whether said attenuation means designated by said antenna fix pointer is the same as said attenuation means designated by said antenna control pointer, if it is judged that said attenuation means are the same, makes said antenna control pointer designate another of said attenuation means, and if it is judged that said attenuation means are different, changes the attenuation amount of said attenuation means designated by said antenna control pointer.

9. The diversity receiver according to claim 8, wherein said antenna fix pointer designates said attenuation means whose attenuation amount is zero, among the plurality of said attenuation means.

10. A method for receiving an orthogonal frequency division multiplex signal by using a plurality of antennas, each of the symbol periods of the signal consisting of an effective symbol section and a guard interval section, the method comprising the steps of:

individually amplifying a plurality of signals which are received by different ones of said plurality of antennas to generate a plurality of amplified signals;

individually attenuating the plurality of amplified signals to generate a plurality of predetermined-level signals;

receiving all said plurality of predetermined-level signals and combining together the received predetermined-level signals to generate a synthesized signal;

individually controlling respective ones of a plurality of attenuation levels used in said attenuating step, in such a way as to instruct to fix to "zero" the attenuation amount for at least one of the plurality of amplified signals corresponding to the plurality of antennas by using an antenna fix pointer and to designate by using an antenna control pointer an antenna for which the attenuation amount is changed wherein it is judged whether attenuation means designated by the antenna control pointer and attenuation means designated by the antenna fix pointer are identical with each other, and if it is judged that they are identical with each other, the attenuation means whose attenuation amount to be switched is changed to another attenuation means, or if it is judged that they are different from each other, an attenuation amount switching process is executed; and demodulating the synthesized signal to obtain a digital signal, wherein said controlling step executes signal processing to adjust each attenuation amount in such a manner that said controlling step selects a received signal received by at least one of the plurality of antennas, and if received signals received by at least two of the plurality of antennas are to be selected, said signal synthesizing step synthesizes only a received signal or signals contributing to a rise of a level of the synthesized received signal, wherein said controlling step executes a signal processing to judge during a period corresponding to the guard interval section whether or not the level of the synthesized received signal rises upon a selection of the received signal received at a given antenna, and wherein said controlling step executes a signal processing to measure the level of the synthesized received signal by setting the attenuation amount of said attenuation attenuating step corresponding to the given antenna to a maximum value or a minimum value, judges whether or not the level of the synthesized received signal rises, and if it is judged that the level rises, changes stepwise the attenuation amount in said attenuating step whose attenuation amount was changed to the maximum value, each time the period corresponding to the guard interval section arrives, so that the attenuation amount is stepwise increased when the set attenuation amount is the maximum value and so that the attenuation amount is stepwise decreased when the set attenuation amount is the minimum value.

11. The method according to claim 10, wherein a judgement on a rise of the level of the synthesized received signal is performed by changing the attenuation amount corresponding to the given antenna during the period corresponding to the guard interval section and measuring a change in the level of the synthesized received signal.

12. The method according to claim 11, wherein in accordance with a measurement result of the change in the level of the synthesized received signal caused by changing the attenuation amount corresponding to the given antenna, said controlling step determines a renewal target attenuation amount corresponding to the given antenna and gradually changes the attenuation amount toward the determined renewal target attenuation amount.

13. The method according to claim 12, wherein a process of changing the attenuation amount toward the renewal target attenuation amount is performed stepwise each time the period corresponding to the guard interval section arrives.

14. The method according to claim 11, wherein said controlling step changes the attenuation amount corresponding to the given antenna during the period corresponding to the guard interval section, and after the level of the synthesized received signal is measured, changes at an end of the period the attenuation amount to the attenuation amount before an attenuation amount change.

* * * * *